US011760658B2

(12) United States Patent
Choi et al.

(10) Patent No.: US 11,760,658 B2
(45) Date of Patent: Sep. 19, 2023

(54) WATER-TREATMENT FILTER MODULE, AND APPARATUS AND METHOD FOR MANUFACTURING HELICAL STRAND OF WATER-TREATMENT FILTER MODULE

(71) Applicant: LG CHEM, LTD., Seoul (KR)

(72) Inventors: Jun Won Choi, Daejeon (KR); Ye Hoon Im, Daejeon (KR)

(73) Assignee: LG Chem, Ltd., Seoul (KR)

( * ) Notice: Subject to any disclaimer, the term of this patent is extended or adjusted under 35 U.S.C. 154(b) by 77 days.

(21) Appl. No.: 16/759,445

(22) PCT Filed: Oct. 30, 2018

(86) PCT No.: PCT/KR2018/012957
§ 371 (c)(1),
(2) Date: Apr. 27, 2020

(87) PCT Pub. No.: WO2019/088633
PCT Pub. Date: May 9, 2019

(65) Prior Publication Data
US 2020/0331771 A1 Oct. 22, 2020

(30) Foreign Application Priority Data
Nov. 3, 2017 (KR) .......................... 10-2017-0145694

(51) Int. Cl.
*C02F 1/00* (2023.01)
*B01D 61/02* (2006.01)
(Continued)

(52) U.S. Cl.
CPC ............ *C02F 1/001* (2013.01); *B01D 61/025* (2013.01); *B01D 61/10* (2013.01); *B01D 63/10* (2013.01);
(Continued)

(58) Field of Classification Search
CPC . C02F 1/001; C02F 1/441; C02F 1/44; B01D 61/025; B01D 61/10; B01D 63/10;
(Continued)

(56) References Cited

U.S. PATENT DOCUMENTS

2003/0205520 A1 11/2003 Johnson
2007/0175812 A1 8/2007 Chikura et al.
(Continued)

FOREIGN PATENT DOCUMENTS

CN 1631497 6/2005
CN 1642625 7/2005
(Continued)

OTHER PUBLICATIONS

Li F et al: "Novel spacers for mass transfer enhancement in membrane separations", Journal of Membrane Science, Elsevier BV, NL, vol. 253, No. 1-2, pp. 1-12 (Year: 2005).*
(Continued)

*Primary Examiner* — Bobby Ramdhanie
*Assistant Examiner* — Donovan Bui-Huynh
(74) *Attorney, Agent, or Firm* — Bryan Cave Leighton Paisner LLP

(57) ABSTRACT

Provided is a water-treatment filter module, an apparatus and a method for manufacturing a helical strand for a water-treatment filter module, and a method for manufacturing a spacer. Also provided is a water-treatment filter module comprising a membrane for filtering raw water, and a spacer laminated to the membrane and providing a plurality of passages for passing the raw water through to the membrane, wherein the spacer includes a first member extending in a first direction and a second member extending in a second direction that is different from the first direction and disposed so as to form spacer cells by intersecting with the first member, and at least one of the first member and the second member is wound in a spiral shape having a predetermined pitch of a predetermined radius around a central axis.

7 Claims, 3 Drawing Sheets

(51) Int. Cl.
    *B01D 61/10*   (2006.01)
    *B01D 63/10*   (2006.01)
    *B01D 65/08*   (2006.01)
    *C02F 1/44*    (2023.01)
(52) U.S. Cl.
    CPC .............. *B01D 65/08* (2013.01); *C02F 1/441* (2013.01); *B01D 2325/021* (2013.01); *B01D 2325/04* (2013.01); *B01D 2325/08* (2013.01)
(58) Field of Classification Search
    CPC .............. B01D 65/08; B01D 2325/021; B01D 2325/04; B01D 2325/08; B01D 2313/14; B01D 2313/143; B01D 63/103; B01D 63/02; B01D 67/002; B01D 2313/025; B01D 2313/08; B01D 2313/21; B01D 2315/05; B01D 2315/06; B01D 2323/42; B01D 2325/027; B01D 2325/06; B01D 61/02; B01D 63/021; B01D 63/024; B01D 63/025; B01D 63/043; B01D 63/046; B01D 63/106; B01D 65/00; B01D 67/0009; B01D 67/0013; B01D 67/0018; B01D 69/082; B01D 69/084; B01D 69/085; B01D 69/087; B01D 71/06; B01D 71/70; B29D 28/00; B29C 33/42; B29C 43/36; B29C 45/00; B29C 45/263; B29C 48/0011; B29C 48/08; B29C 48/13; B29C 53/24; D01D 5/24; D01D 5/247
    See application file for complete search history.

(56) References Cited

U.S. PATENT DOCUMENTS

| | | | |
|---|---|---|---|
| 2010/0108593 | A1 | 5/2010 | Chikura et al. |
| 2013/0146532 | A1 | 6/2013 | Dontula et al. |
| 2015/0375173 | A1 | 12/2015 | Steen |
| 2018/0207586 | A1 | 7/2018 | Choi et al. |
| 2019/0217253 | A1* | 7/2019 | Syron ................ B01D 63/021 |

FOREIGN PATENT DOCUMENTS

| | | | | |
|---|---|---|---|---|
| CN | 102600728 | A | * 7/2012 | |
| CN | 203507832 | U | 4/2014 | |
| CN | 106132517 | | 11/2016 | |
| EP | 3415224 | A1 | 12/2018 | |
| JP | 2019534786 | A | * 12/2019 | ............ B01D 65/08 |
| KR | 10-20040106486 | | 12/2004 | |
| KR | 10-20050025154 | | 3/2005 | |
| KR | 10-20160022910 | | 3/2016 | |
| KR | 20-20160003127 | | 9/2016 | |
| KR | 10-20170038646 | | 4/2017 | |
| PL | 185963 | B1 | * 10/1997 | |
| TW | 201334856 | | 9/2013 | |
| WO | WO-2004009222 | A1 | * 1/2004 | ............ B01D 63/10 |
| WO | 2015200691 | | 12/2015 | |

OTHER PUBLICATIONS

Syron, Eoin: Self-coiling hollow fiber membrane, ip.com (Year: 2019).*
Li et al.; Novel spacers for mass transfer enhancement in membrane separations; Feb. 11, 2005; p. 1-12 (Year: 2005).*
Fritzmann et al.; Helically microstructured spacers improve mass transfer and fractionation selectivity in ultrafiltration; Mar. 28, 2014; p. 1-8 (Year: 2014).*
Shrivastava et al; Predicting the effect of membrane spacers on mass transfer; Jun. 5, 2008; p. 1-10 (Year: 2008).*
Li et al., "Novel spacers for mass transfer enhancement in membrane separations," Journal of Membrane Science 253: 1-12 (2005).
Shrivastava et al., "Predicting the effect of membrane spacers on mass transfer," Journal of Membrane Science 323: 247-256 (2008).
Sreedhar et al., "3D printed feed spacers based on triply periodic minimal surfaces for flux enhancement and biofouling mitigation in RO and UF," Desalination 425: 12-21 (2018).
International Search Report and the Written Opinion of PCT/KR2018/012957, dated Apr. 3, 2019.

* cited by examiner

[Figure 1]
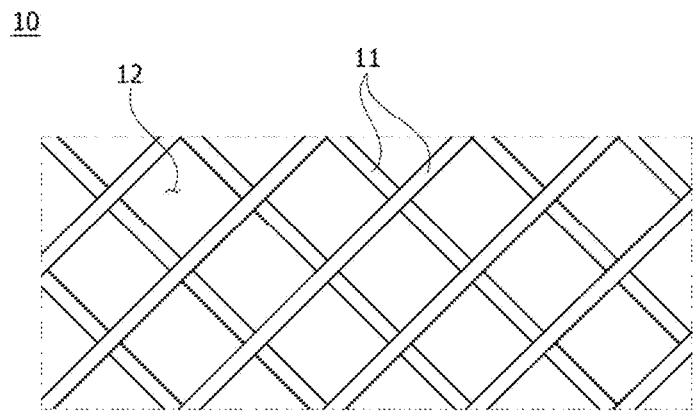
< Prior Art >
[Figure 2]
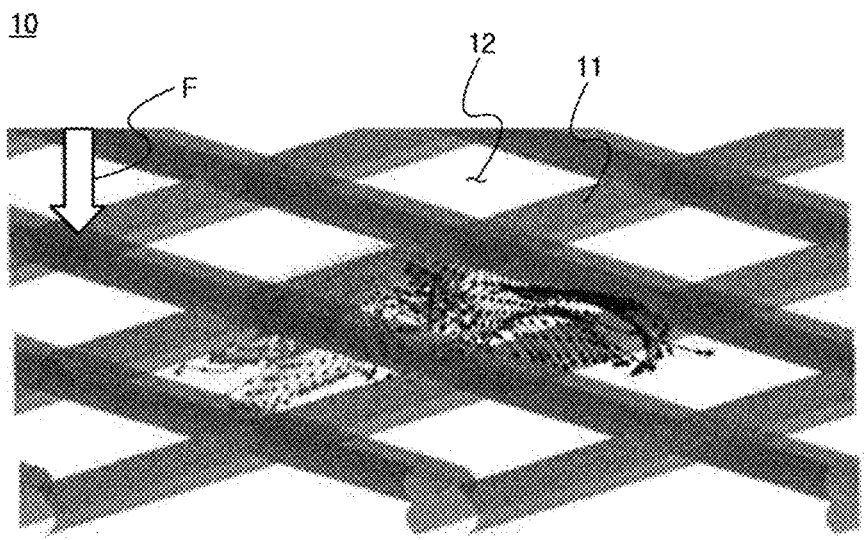
< Prior Art >
[Figure 3]
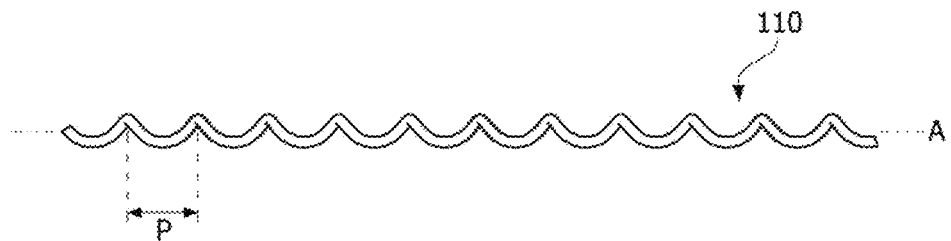

[Figure 4]
100
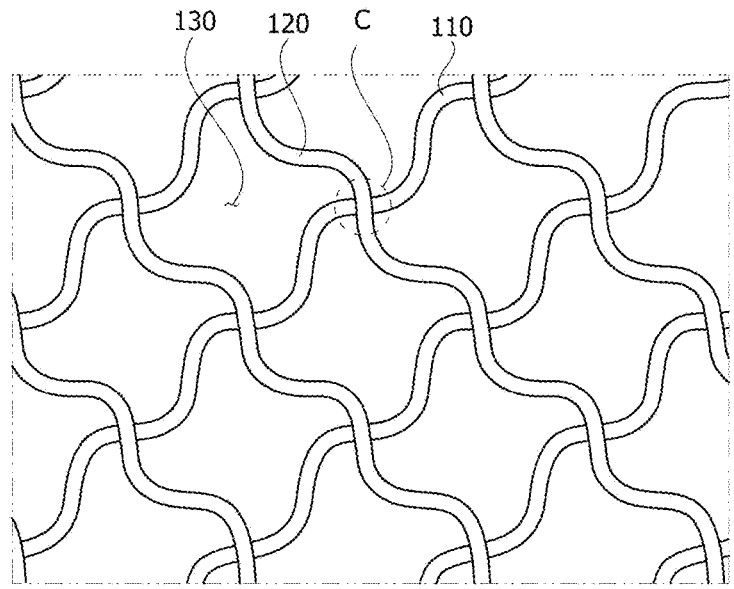
[Figure 5]
100
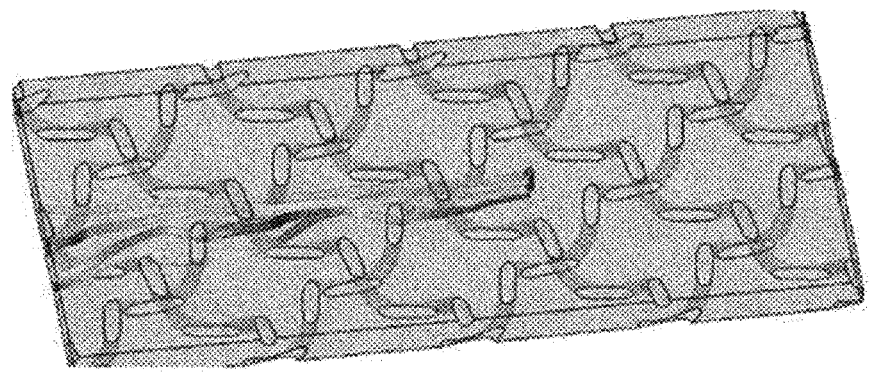

[Figure 6]
210
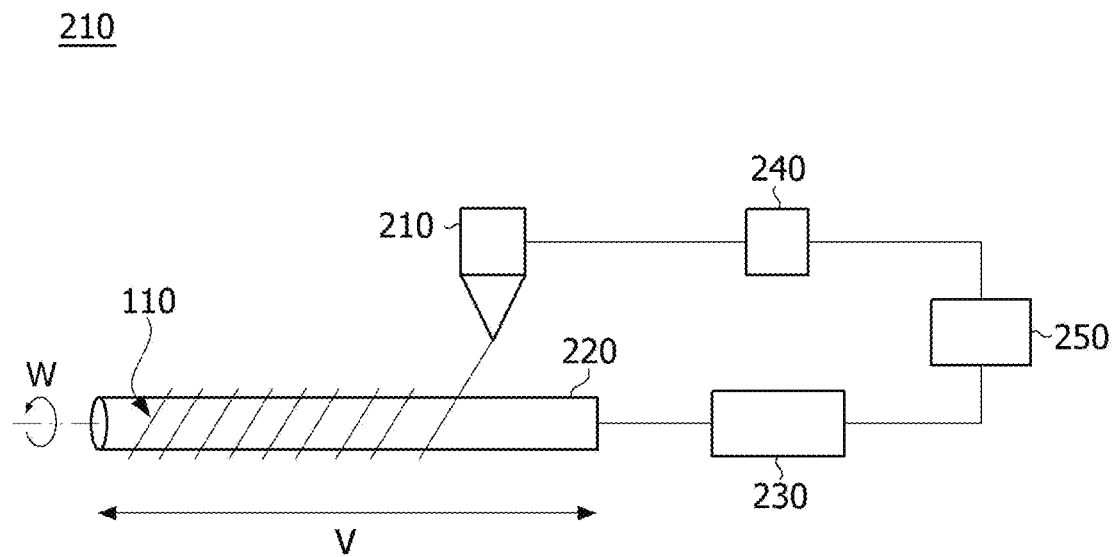

WATER-TREATMENT FILTER MODULE, AND APPARATUS AND METHOD FOR MANUFACTURING HELICAL STRAND OF WATER-TREATMENT FILTER MODULE

CROSS-REFERENCE TO RELATED APPLICATIONS

This application is a National Stage Application of International Application No. PCT/KR2018/012957 filed on Oct. 30, 2018, which claims the benefit of priority based on Korean Patent Application No. 10-2017-0145694 filed on Nov. 3, 2017, the disclosure of which is incorporated herein by reference in its entirety.

TECHNICAL FIELD

The present invention relates to a water-treatment filter module, an apparatus and a method for manufacturing a helical strand for a water-treatment filter module, and a method for manufacturing a spacer.

BACKGROUND

A water-treatment filter module is a device for removing impurities from raw water.

Recently, water treatment technology has become important due to environmental pollution and the like, and in particular, a membrane water-treatment module using reverse osmosis can be used to purify raw water by removing polymers, colloids and grains (particles).

A process of moving a solution with a high concentration toward a low concentration by using pressure is called "reverse osmosis" and a device for purifying water by passing only water molecules through a semipermeable membrane using this principle is called a reverse osmosis membrane water-treatment module. At this time, the semipermeable membrane is a "reverse osmosis membrane filter" and one obtained by modularizing these filters is a reverse osmosis membrane filter module.

In such a reverse osmosis membrane filter module, a spiral-wound separation membrane module can be used.

The spiral-wound separation membrane module has a structure in which a membrane and a spacer are alternately laminated. The membrane performs a function of filtering the impurities.

FIG. 1 is a plan view of a conventional spacer (10), and FIG. 2 is an analysis result showing representative flows in the spacer (10) shown in FIG. 1.

Referring to FIG. 1, the spacer (10) forms a passage through which raw water flows into a membrane. For example, the spacer (10) has a net-like web structure. Specifically, the spacer (10) includes a plurality of strands (11) arranged in a crossed fashion so as to form spacer cells (12) through which the raw water can pass.

On the other hand, as shown in FIG. 2, when the raw water is introduced, a differential pressure is generated due to flow disturbance by the spacer, which increases energy costs.

In particular, referring to FIG. 2, the volume increases at contact points where a number of strands (11) intersect, and whirlpools occur in the corresponding region. This whirlpool phenomenon increases pressure loss. In FIG. 2, the reference symbol F denotes the main flow direction.

In addition, a concentration polarization occurs near the membrane necessarily due to water permeation flux, whereas this phenomenon becomes more severe, the osmotic pressure increases near the membrane and the water permeability decreases.

Therefore, it is required to design a spacer capable of generating a low differential pressure and mitigating the concentration polarization phenomenon.

On the other hand, in conventional type spacers, extrusion has been used, but it is difficult to manufacture various types of spacers in this manner, and when injection molding is used for precise shape control, there is a problem that production costs increase because the mold has to be manufactured.

BRIEF DESCRIPTION

Technical Problem

It is an object of the present invention to provide a water-treatment filter module, a helical strand for a water-treatment filter module, and an apparatus and a method for manufacturing a spacer, which can generate a low differential pressure and mitigate a concentration polarization phenomenon.

Technical Solution

To solve the above-described problems, according to one aspect of the present invention, there is provided a water-treatment filter module comprising a membrane for filtering raw water; and a spacer laminated to the membrane and providing a plurality of passages for passing raw water through the membrane, wherein the spacer comprises a first member extending in a first direction; and a second member extending in a second direction different from the first direction and disposed so as to form spacer cells by intersecting with the first member, and at least one of the first member and the second member is wound in a spiral extended coil shape having a predetermined pitch of a predetermined radius around a central lumen in the extended direction (central axis).

Also, according to another aspect of the present invention, there is provided an apparatus for manufacturing a helical strand of a water-treatment filter module, comprising: an extrusion nozzle; a rotating roll on which a strand extruded from the extrusion nozzle is wound; a first driving part for axial movement and rotation of the rotating roll; and a control part for adjusting the rotation speed and the axial movement speed of the rotating roll in order to adjust the pitch of the helical strand wound on the rotating roll.

Furthermore, according to another aspect of the present invention, there is provided an apparatus for manufacturing a helical strand of a water-treatment filter module, comprising: an extrusion nozzle; a rotating roll on which a strand extruded from the extrusion nozzle is wound; a second driving part for rotation of the rotating roll; a third driving part for moving the extrusion nozzle along the axial direction of the rotating roll; and a control part for adjusting the rotation speed of the rotating roll and the axial movement speed of the extrusion nozzle in order to adjust the pitch of the helical strand wound on the rotating roll.

In addition, according to another aspect of the present invention, there is provided a method for manufacturing a helical strand of a water-treatment filter module, comprising steps of: extruding a strand through an extrusion nozzle; and rotating a rotating roll and simultaneously moving at least one of the rotating roll and the extrusion nozzle along the axial direction of the rotating roll, thereby winding the strand on the rotating roll in a spiral shape to form a helical strand.

According to still another aspect of the present invention, there is also provided a method for manufacturing a spacer of a water-treatment filter module, comprising steps of: extruding a strand through an extrusion nozzle; rotating a rotating roll and simultaneously moving at least one of the rotating roll and the extrusion nozzle along the axial direction of the rotating roll, thereby winding the strand on the rotating roll in a spiral shape to form a helical strand; and arranging a plurality of helical strands in a cross fashion without any contact point to manufacture a spacer.

Advantageous Effects

As described above, the water-treatment filter module, the helical strand for the water-treatment filter module, and the apparatus and method for manufacturing the spacer, related to at least one example of the present invention have the following effects.

By constituting the strands forming the spacer with helical strands having a wound spiral extended coil shape having a predetermined radius and pitch around a central lumen, the flow can be directed to the surface of the membrane, the whirlpool occurrence can be prevented due to removal of the contact points in the cross regions and the pressure loss can be minimized.

The production cost increase can be suppressed upon manufacturing the helical strand.

BRIEF DESCRIPTION OF DRAWINGS

FIG. 1 is a plan view of a conventional spacer.

FIG. 2 is an analysis result showing representative flows in the spacer shown in FIG. 1.

FIGS. 3 and 4 are diagrams showing a spacer constituting a water-treatment filter module according to an exemplary embodiment of the present invention.

FIG. 5 shows an analysis result using the spacer shown in FIG. 4.

FIG. 6 is a schematic diagram for explaining an apparatus and a method for manufacturing a helical strand for a water-treatment filter module according to an exemplary embodiment of the present invention.

DETAILED DESCRIPTION

Hereinafter, a water-treatment filter module, a helical strand for a water-treatment filter module, and an apparatus and a method for manufacturing a spacer, according to one example of the present invention, will be described in detail with reference to the accompanying drawings.

In addition, the same or similar reference numerals are given to the same or corresponding components regardless of reference numerals, of which redundant explanations will be omitted, and for convenience of explanation, the size and shape of each constituent member as shown may be exaggerated or reduced.

FIGS. 3 and 4 are diagrams showing a spacer (100) constituting a water-treatment filter module related to one example of the present invention, and FIG. 5 shows an analysis result using the spacer (100) shown in FIG. 4.

The water-treatment filter module associated with one example of the present invention comprises a membrane for filtering raw water and a spacer (100) laminated to the membrane and providing a plurality of passages (also referred to as 'spacer cells') for passing raw water through the membrane.

The membrane can be formed of various materials capable of a reverse osmosis phenomenon.

The spacer (100) comprises a first member (110) extending in a first direction and a second member (120) extending in a second direction different from the first direction and disposed so as to form spacer cells (130) by intersecting with the first member (110).

Each of the first member (110) and the second member (120) is the above-described strand, which can be formed of a resin material, and in particular, can be formed of the same resin material, and for example, can be formed of a polyethylene (PE) resin, a polypropylene (PP) resin, or a combination thereof. Furthermore, the first member (110) and the second member (120) can have a substantially circular (or elliptical) cross section and can have a diameter of 50 μm to 200 μm.

At least one member of the first member (110) and the second member (120) is wound in a spiral extended coil shape with a predetermined pitch (p) of a predetermined radius around a central lumen in the extended direction (central axis A). That is, at least one of the first member (110) and the second member (120) is the spirally wound helical strand based on the central axis (A).

Also, the first member (110) and the second member (120) each have a helical shape that is wound at a predetermined pitch of a predetermined radius around a central lumen in the extended direction (central axis).

Furthermore, the first member (110) and the second member (120) can be helical strands wound along the same rotational direction based on the central axis (A). Otherwise, the first member (110) and the second member (120) can be helical strands wound along different rotational directions.

In addition, the first member (110) and the second member (120) can have the same radius and the same pitch.

The pitch (p) can be 1800 μm to 3000 μm. If the pitch (p) has a value smaller than this numerical value range, the cost increases excessively, whereas if the pitch (p) has a value larger than this numerical value range, the flow passage reduction can be severe upon packing.

In addition, the radius can be 100 μm to 500 μm. If the radius has a value smaller than this numerical value range, the pressure loss becomes excessively high, whereas if the radius has a value larger than this numerical value range, the radius of the water-treatment filter module becomes excessively large and thus the efficiency decreases.

On the other hand, the first member (110) and the second member (120) can be crossed and arranged in cross regions (C) without any contact point. The spacer (100) can also hold the spacer cells (130) only in the cross-arranged state without any separate bonding in cross regions by the helical shape of the first and second members (110, 120).

Also, the first member (110) and the second member (120) can be crossed and arranged so that the spacer cells (130) have a roughly diamond shape.

Referring to FIG. 5, it can be confirmed that upward and downward flows occur in the cross regions without whirlpools.

The differential pressure has been analyzed through the spacer shown in FIG. 1 and the spacer shown in FIG. 4.

In the spacer of FIG. 1, the distance between the strands is 2750 μm, and in the spacer of FIG. 4, the pitch of the helical strands is 2750 μm. When measured, the differential pressure in the spacer of FIG. 1 was about 1032 Pa, and the differential pressure in the spacer of FIG. 4 was 665 Pa.

Hereinafter, an apparatus and a method for manufacturing a helical strand and a spacer having the same structure as the first and second members (110, 120) will be described in detail.

FIG. 6 is a schematic diagram for explaining an apparatus (200) and a method for manufacturing a helical strand for a water-treatment filter module associated with one example of the present invention.

Referring to FIG. 6, an apparatus (200) for manufacturing a helical strand of a water-treatment filter module associated with a first example comprises an extrusion nozzle (210), a rotating roll (220) on which a strand extruded from the extrusion nozzle (210) is wound, a first driving part (240) for axial movement and rotation of the rotating roll (220) and a control part (250) for adjusting the rotation speed (w) and the axial movement speed (v) of the rotating roll (220) in order to adjust the pitch (p) of the helical strand wound on the rotating roll (220).

According to the first example, the strand is extruded from the extrusion nozzle (210), and the extruded strand is spirally wound on the rotating roll (220), thereby being made into a helical strand. At this time, the first driving part (230) adjusts the pitch (p) of the helical strand wound on the rotating roll (220) by rotating the rotating roll (220) and simultaneously performing the axial movement of the rotating roll (220). When the helical strand is removed from the rotating roll (220), the helical strand has a wound spiral extended coil shape having a predetermined radius and pitch around a central lumen in the extended direction (central axis A), as shown in FIG. 3.

Alternatively, an apparatus (200) for manufacturing a helical strand of a water-treatment filter module associated with a second example of the present invention comprises an extrusion nozzle (210), a rotating roll (220) on which a strand extruded from the extrusion nozzle (210) is wound, a second driving part for rotation of the rotating roll (220), a third driving part (240) for moving the extrusion nozzle (110) along the axial direction of the rotating roll (220), and a control part (250) for adjusting the rotation speed of the rotating roll (220) and the axial movement speed of the extrusion nozzle (210) in order to adjust the pitch of the helical strand wound on the rotating roll. In this example, the second driving part is provided to drive only the rotation of the rotating roll (220), unlike the first driving part (230) of the first example.

According to the second example, the strand is extruded from the extrusion nozzle (210), and the extruded strand is spirally wound on the rotating roll (220), thereby being made into a helical strand. At this time, the second driving part is provided so as to rotate the rotating roll, and the third driving part (240) is provided so as to adjust the pitch of the helical strand wound on the rotating roll (220) by moving the extrusion nozzle (210) along the axial direction of the rotating roll (220). When the helical strand is removed from the rotating roll (220), the helical strand has a wound spiral extended coil shape having a predetermined radius and pitch around a central lumen in the extended direction (central axis A), as shown in FIG. 3.

That is, there is a difference in that the axial movement target in the first example is the rotating roll (220), and the axial movement target in the second example is the extrusion nozzle (210).

A manufacturing method using a manufacturing apparatus (200) having the above structure is a method for manufacturing a helical strand of a water-treatment filter module, which comprises steps of: extruding a strand through an extrusion nozzle; and rotating a rotating roll (220) and simultaneously moving at least one of the rotating roll (220) and the extrusion nozzle (210) along the axial direction of the rotating roll, thereby winding the strand on the rotating roll (220) in a spiral shape to form a helical strand.

In order to adjust the pitch (p) of the helical strand, the step of forming the helical strand can further comprise a step of adjusting the rotation speed (w) and the axial movement speed (v) of the rotating roll (220).

A method for manufacturing a spacer for a water-treatment filter module using a helical strand comprises steps of extruding a strand through an extrusion nozzle, rotating a rotating roll and simultaneously moving at least one of the rotating roll and the extrusion nozzle along the axial direction of the rotating roll, thereby winding the strand on the rotating roll in a spiral shape to form a helical strand and arranging a plurality of helical strands in a cross fashion without any contact point to manufacture a spacer.

The preferred examples of the present invention as described above are disclosed for illustrative purposes, which can be modified, changed and added within the spirit and scope of the present invention as those skilled in the art will recognize, and it will be considered that such modification, change and addition fall within the scope of the following claims.

INDUSTRIAL APPLICABILITY

According to the present invention, by constituting the strands forming the spacer with helical strands having a predetermined radius and pitch, the flow can be directed to the surface of the membrane, the whirlpool occurrence can be prevented due to removal of the contact points in the crossing regions, and the pressure loss can be minimized.

The invention claimed is:

1. A water-treatment filter module, comprising:
a membrane for filtering raw water; and
a spacer laminated to the membrane and providing a plurality of passages for passing raw water through the membrane,
wherein the spacer contains only two members:
a first member comprising a plurality of strands each having a wound spiral extended coil shape having a predetermined pitch of 1800 μm to 3000 μm around a central lumen along a central axis having a predetermined radius of from 100 μm to 500 μm, and each strand having a substantially circular or elliptical cross section, and having a diameter of 50 μm to 200 μm, and extending in a first direction; and
a second member comprising a plurality of strands each having a wound spiral extended coil shape having a predetermined pitch of 1800 μm to 3000 μm around a central lumen along a central axis of a predetermined radius of from 100 μm to 500 μm, and each strand having a substantially circular or elliptical cross section, and a having diameter of 50 μm to 200 μm, and extending in a second direction different from the first direction, and disposed so the first member and the second member are crossed and arranged without any contact point between the first member and the second member at a cross region to form spacer cells.

2. The water-treatment filter module according to claim 1, wherein the first member and the second member are wound along the same rotational direction.

3. The water-treatment filter module according to claim 1, wherein the first member and the second member are wound along different rotational directions.

4. The water-treatment filter module according to claim 1, wherein the first member and the second member have the same radius and the same pitch.

5. The water-treatment filter module according to claim 1, wherein the first member and the second member are crossed and arranged so that the plurality of passages have a diamond shape.

6. A method for manufacturing a spacer of the water-treatment filter module according to claim 1, comprising steps of:
   extruding a strand through an extrusion nozzle;
   rotating a rotating roll and simultaneously moving at least one of the rotating roll and the extrusion nozzle along the axial direction of the rotating roll, thereby winding the strand extruded through the extrusion nozzle on the rotating roll in a spiral shape to form a helical strand;
   removing the helical strand from the rotating roll to yield the helical strand having a wound spiral extended coil shape having a predetermined pitch of 1800 µm to 3000 µm around a central lumen along a central axis of a predetermined radius of from 100 µm to 500 µm, and each strand having a substantially circular or elliptical cross section, and a having diameter of 50 µm to 200 µm; and
   arranging a plurality of helical strands in a cross fashion without any contact point to manufacture a spacer.

7. The water-treatment filter module according to claim 1, wherein the first members and second members forming the spacer direct flow to a surface of the membrane, and because there are no contact points at a cross region, upward and downward flow occurs in the cross region without whirlpools, and pressure loss is minimized.

\* \* \* \* \*